United States Patent [19]

Leedom

[11] 3,882,267

[45] May 6, 1975

[54] VIDEO PLAYBACK SYSTEM TRACKING ARM AND PICKUP ASSEMBLY

[75] Inventor: Marvin Allan Leedom, Princeton, N.J.

[73] Assignee: RCA Corporation, New York, N.Y.

[22] Filed: Dec. 14, 1972

[21] Appl. No.: 314,976

[30] Foreign Application Priority Data

Apr. 19, 1972 United Kingdom............... 18154/72

[52] U.S. Cl....... 178/6.6 A; 179/100.1 B; 274/23 A

[51] Int. Cl.......................... G11b 11/06; H04n 5/76

[58] Field of Search............ 179/100.1 B, 100.41 R, 179/100.41 B, 100.41 C, 100.41 G, 100.41 D, 100.4 R; 178/6.6 A; 274/36, 37, 23 A, 23 B, 38

[56] References Cited

UNITED STATES PATENTS

| | | | |
|---|---|---|---|
| 2,432,444 | 12/1947 | Roberts | 179/100.41 G |
| 3,075,054 | 1/1963 | Cvetko | 274/37 |
| 3,444,335 | 5/1969 | Walton | 274/37 |
| 3,711,641 | 1/1973 | Palmer | 179/100.2 K |

FOREIGN PATENTS OR APPLICATIONS

| | | | |
|---|---|---|---|
| 327,287 | 4/1930 | United Kingdom | 274/37 |
| 1,181,275 | 11/1964 | Germany | 178/6.6 A |

*Primary Examiner*—Terrell W. Fears
*Assistant Examiner*—David K. Moore
*Attorney, Agent, or Firm*—Eugene M. Whitacre; J. B. Hayes; William H. Meagher

[57] ABSTRACT

A capacitive type video playback system includes an elongated tracking arm supported within a conductive housing having a first portion substantially parallel to the conductive housing bottom surface and a second portion sloped toward an opening in the conductive housing bottom surface. A tracking stylus is supported by the tracking arm such that the longitudinal axis of the stylus is substantially normal to the major surface of a disc record when the tracking stylus engages the disc record groove.

Detachable connector means may be provided for supporting the tracking stylus in proper operating position and for electrically connecting the stylus conductive electrode to the playback system signal processing circuitry. The moving mass which must follow vertical and lateral warpage of the disc record groove is reduced by a yieldable suspension member connected between the tracking stylus and tracking arm. A second yieldable suspension member connected between the tracking arm and a support supports the tracking arm in a manner which enables it to follow vertical and lateral warpage of the disc record groove communicated to the tracking arm through the first suspension member.

12 Claims, 5 Drawing Figures

VIDEO PLAYBACK SYSTEM TRACKING ARM AND PICKUP ASSEMBLY

The present invention relates to video playback systems and more particularly to a tracking arm and pickup assembly for use in a video disc type playback system.

In certain video disc playback systems, video information is recorded by means of geometric variations in the bottom of a smooth spiral groove on the surface of a disc record. The disc surface includes a conductive material covered with a thin coating of dielectric material. A tracking stylus engages the spiral groove and includes a conductive surface or electrode which cooperates with the conductive material and dielectric coating to form a capacitor. Systems of this type are shown in a U.S. Pat. application Ser. No. 126,678, filed Mar. 22, 1971 and now U.S. Pat. No. 3,783,196, for Thomas Osborne Stanley and entitled, "High-Density Information Records and Playback Apparatus Therefor," and a U.S. pat. application, Ser. No. 126,772, filed Mar. 22, 1971 and now U.S. Pat. No. 3,842,194, for Jon Kaufman Clemens and entitled, "INFORMATION RECORDS AND RECORDING/PLAYBACK SYSTEMS THEREFOR." Both application are assigned to RCA Corporation.

In systems of the above-described type, as the record is rotated, an edge of the conductive electrode of the stylus while riding in the disc groove cooperates with the record to establish capacitive variations due to the geometrical variations in the bottom of the spiral groove The capacitor formed by the record and stylus is connected to a tuned circuit. Consequently, as the record is rotated the resulting capacitive variations vary the resonant frequency of the tuned circuit. The tuned circuit is energized by a fixed frequency oscillator, and thus, as the resonant frequency of the tuned circuit varies (due to the geometrical variations in the bottom of the spiral groove) the response of the tuned circuit to the excitation signal voltage changes as a function of the recorded information. This provides output signals whose amplitude varies as a function of the recorded information.

The tracking arm and pickup assembly disclosed in the Clemens application, supra, includes a stylus having a conductive electrode attached to a tubular paper tracking arm by means of a stylus mounting cap. The tracking arm is in turn attached to a groove velocity error correction drive mechanism by means of a flexible pivot assembly. A flexible beryllium copper conductor electrically connects the stylus conductive electrode and th tuned circuit. The velocity error correction drive mechanism is described in detail in a U.S. patent application, Ser. No. 126,797, filed Mar. 22, 1971 and now U.S. Pat. No. 3,711,641, for Richard Claxton Palmer and entitled, "VELOCITY ADJUSTING SYSTEM," and the flexible pivot is described in detail in a U.S. patent application, Ser. No. 126,677, filed Mar. 22, 1971 and now abandoned, for Marvin Allan Leedom and entitled, "STYLUS ARM PIVOT." Both applications are assigned to RCA Corporation.

It has been recognized that the fixed frequency oscillator can be the source of undesired radiation. Consequently, it has been proposed, as for example in the Clemens application, supra, that the oscillator stage and other portions of the video playback signal processing circuits be shielded. To reduce the length of interconnections between the stylus and the signal processing circuitry, portions of the signal processing circuitry including the fixed frequency oscillator have been mounted and shielded in a conductive compartment in the tracking arm housing. Nevertheless, it is necessary that the stylus protrude from the housing so that it can engage a video disc record to be played. The opening through which the stylus and stylus support protrude provides an opening through which oscillator energy can escape. Consequently, it is desirable to minimize the opening through which the stylus and stylus support protrude, while still providing sufficient space for the stylus and stylus support to have unobstructed free motion to enable tracking of the vertical and lateral warpage of the video disc record groove.

Although the tracking arm and pickup assembly shown in the Clemens application, supra, and described briefly above, is very satisfactory and provides excellent performance, it is desirable to provide an assembly which is particularly suitable for mass production techniques. Moreover, it is desirable that the tracking arm and pickup assembly be simple in construction, reliable, and replaceable by a relatively untrained user without the need to make difficult electrical connections. In this regard, replacement of a worn stylus should be achieved in a manner that minimizes the likelihood of a misalignment of the tracking arm and pickup assembly which could degrade the peformance of the video playback system. Additionally, since the system does not rely on movement of the stylus in detecting recorded information, it is highly desirable that the stylus be able to follow vertical and lateral warpage of the smooth spiral groove. This simplifies and thus reduces the cost of fabricating video disc records because a greater amount of warpage can be tolerated without degrading the performance of the system.

A video playback system embodying the present invention includes a video disc record having geometrical variations in the bottom of a spiral groove on a major surface of the disc record. The record is of the type having a conductive material covered with a coating of dielectric material. A tracking stylus having a longitudinal axis engages the disc record spiral groove. The tracking stylus includes a conductive electrode which cooperates with the conductive material and dielectric coating of the disc record to form a varying capacitance as the disc record is rotated. Means are provided for electrically connecting the stylus conductive electrode to a tuned circuit which is energized by a fixed frequency oscillator. An elongated tracking arm is supported within a conductive housing and has a first portion substantially parallel to the conductive housing bottom surface and a second portion sloped toward an opening in the conductive housing bottom surface. Means are connected between the tracking stylus and the end of the tracking arm adjacent said conductive housing opening for supporting the tracking stylus. The tracking stylus is supported in a manner such that the longitudinal axis off the tracking stylus is substantially normal to the major surface of said disc record when the tracking stylus engages the record groove.

In accordance with a feature of the present invention, detachable connector means are coupled between the tracking stylus and the tracking arm. The detachable connector supports the tracking stylus in proper operating position when the tracking stylus engages the video disc record groove. The detachable connector additionally electrically connects the tracking stylus conductive electrode to signal processing circuitry associated with the video playback system.

In accordance with another feature of the present invention, a first yieldable suspension means is connected between the tracking stylus and the tracking arm. The first yieldable suspension means reduces the mass which must follow vertical and lateral warpage of said disc record groove. A second yieldable suspension means may also be provided. The second yieldable suspension means is coupled between the tracking arm and a support member. The second yieldable suspension means supports the tracking arm in a manner which enables the tracking arm to follow the vertical and lateral warpage of said video disc record groove communicated to the tracking arm through the first yieldable suspension member.

A complete understanding of the present invention may be obtained from the following detailed description of a specific embodiment thereof, when taken in conjunction with the accompanying drawings, in which.

Figures 1, 2:
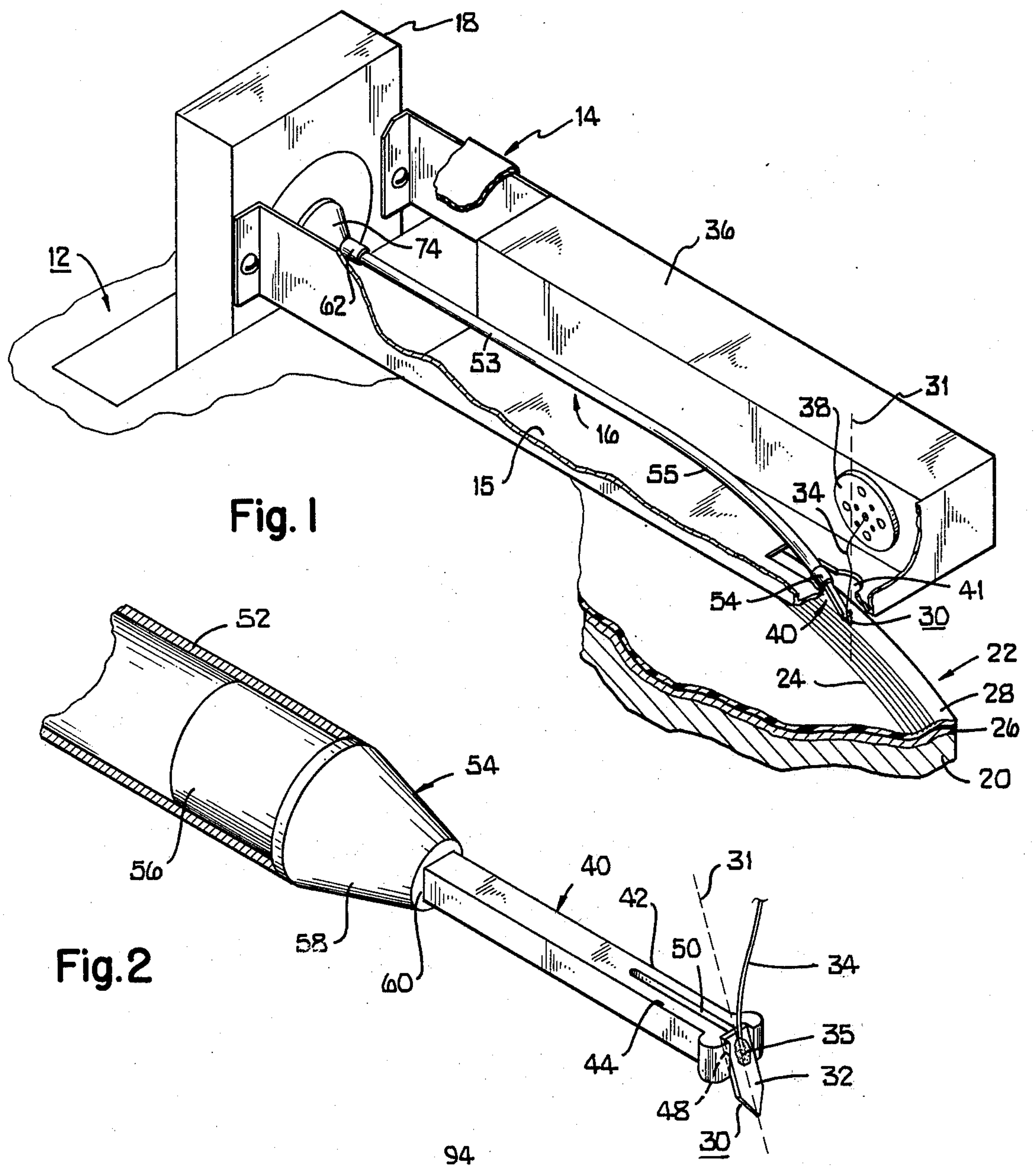
FIG. 1 is a partial perspective view of a video playback system tracking arm and pickup assembly embodying the present invention and broken away to expose details of construction.
FIG. 2 is an enlarged perspective view, partially broken away, of a portion of the video playback system tracking arm and pickup assembly shown in FIG. 1.
Figure 3:
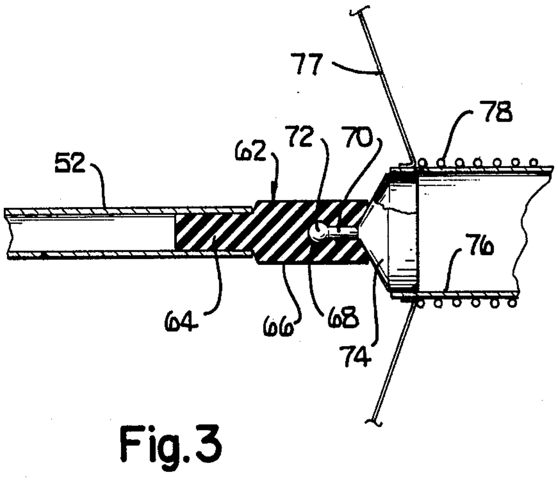
FIG. 3 is an enlarged section view, partially broken away, of the rear portion of the tracking arm taken along the longitudinal axis of the tracking arm and pickup assembly and showing the suspension member coupling the tracking arm to the video playback system groove velocity error correction drive mechanism.

Referring now to the drawings wherein like reference numerals designate similar elements in various views, and more particularly, referring now to FIGS. 1–3, a video playback system 12 includes aa conductive housing 14 enclosing a tracking arm and pickup assembly 16. The conductive housing 14 is mounted to a support member 18 which encloses a groove velocity error correction drive mechanism described in the Palmer application, supra. The system includes a turntable 20 supporting a video disc record 22. The video disc record is of the type having video information recorded by means of geometrical variations (not shown) in the bottom of a smooth spiral groove 24 on the surface of the record. The video disc record 22 includes a conductive material 26 covered with a thin coating of dielectric material 28.

A tracking stylus 30 engages the spiral groove 24 and includes a conductive electrode 32 (FIG. 2) which cooperates with the conductive material and dielectric coating on the disc record to form a capacitance. One suitable stylus is described in a U.S. patent application. Ser. No. 286,657, filed Sept. 6, 1972 and now U.S. Pat. No. 3,827,877, for Marvin Allan Leedom and Michael Evans Miller and entitled, "INFORMATION PLAYBACK SYSTEM STYLUS." The present application is assigned to RCA Corporation. As the video disc record 22 is rotated, the conductive surface 32 of the stylus 30 while riding in the disc groove 24 cooperates with the record to establish capacitive variations due to the geometrical variations in the bottom of the spiral groove. The capacitor formed by the video disc record 22 and the stylus conductive electrode 32 is electrically connected by a thin beryllium copper wire 34 to a tuned circuit. The tuned circuit is housed within a conductive compartment 36 of the conductive housing 14 and is energized by a fixed frequency oscillator. Since the fixed frequency oscillator signals are applied to the tuned circuit whose resonant frequency varies during operation, the response of the tuned circuit to the excitation signal voltage changes as a function of the recorded information. This results in an output signal whose amplitude varies as a function of the recorded information. The conductive compartment 36 is sealed by a plate 38 having openings for passage of the beryllium copper wire 34.

The tracking stylus 30 is supported by a suspension arm 40. The suspension arm includes two laterally spaced notched prongs 42 and 44. The notched prongs define a recessed sloped surface 48. The sloped surface 48 is most clearly shown in FIG. 5. The laterally spaced notched prongs 42 and 44 are laterally deflected and bear against the stylus 30 in abutting relationship to the sloped recessed surface 48. This properly orients the stylus 30 for playing the video disc record 22. The prongs 42 and 44 clamp the stylus in place during assembly while the beryllium copper electrical lead 34 is glued in place with the silver paste 35 and the top 50 of the suspension arm 40 is dipped in a glue to permanently bond the tracking stylus 30 to the suspension arm recessed surface 48.

The suspension arm 40 is mounted to an elongated tubular tracking arm 52 by a yieldable suspension member 54. The tracking arm 52 is fabricated from 1 milli-inch thick aluminum stock and suspension member 54 is molded from a highly damped elastomer such as butyl rubber. The suspension member 54 includes a cylindrical portion 56 which nestles within and is glued to the front end of the tracking arm 52. The suspension member 54 additionally includes a second conical portion 58 having a square hole 60 into which the rear end of the stylus suspension arm 40 is inserted. The yieldable suspension member 54 allows the stylus suspension arm to move independently of the tracking arm 52. Consequently, the yieldable suspension member 54 reduces the moving mass which must follow vertical and lateral warpage of the video disc record groove 24.

The rear end of the tubular tracking arm 52 is mounted to the velocity error correction drive mechanism, as is shown in FIG. 3, by means of a yieldable suspension member 62. The suspension member 62 is fabricated from a highly damped elastomer such as butyl rubber. The suspension member 62 includes a first cylindrical portion 64 which nestles within and is glued to the rear end of the tubular tracking arm 52 and a second cylindrical portion 66 containing a female recteptacle 68. Both the suspension member portion 64 and the suspension member portion 56 may be mechanically interlocked with the tracking arm 52 by means such as punched holes in the sides of the tracking arm that cooperate with matching projections molded into the side of the portions 56 and 64. The female receptacle 68 mates with a plug 70 having a protuberance 72 providing a detent. Plug 70 is supported by a cone 74 which is glued to a moving coil form 76 of the groove velocity error correction drive mechanism.

The groove velocity error correction drive mechanism operates in response to an error signal applied to winding 78 secured to the coil form 76. The coil form 76 which is part of a speaker assembly 77 is thus caused to move and change the position of the entire tracking arm and pickup assembly with respect to the video disc record groove 24. The movement corrects for speed variations detected and represented by the error signal. The details of construction and operation of the velocity error correction drive mechanism are described in detail in the Palmer application, supra. It should be recognized that the suspension members 54 and 62 are sufficiently rigid in the direction of movement of the groove error velocity correction drive mechanism so that the upper frequency response of the correction mechanism is not degraded.

Figure 4:
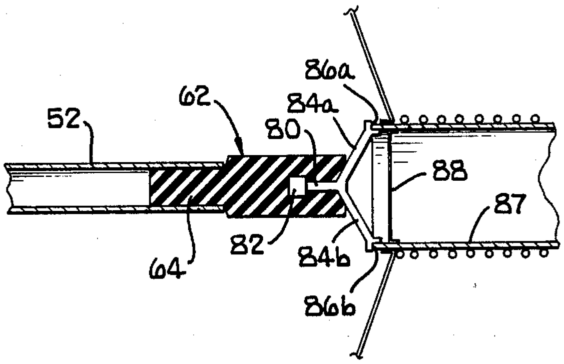
FIG. 4 is an enlarged section view similar to FIG. 3 and showing an alternate construction from that of the rear portion of the tracking arm.

FIG. 4 shows an alternate mounting arrangement for the rear end of the tracking arm wherein the female receptacle is molded in the suspension member portion 68 to mate with a plug 80 having a cubic protuberance 82. The support cone 74 is replaced by divergent support arms 84*a* and 84*b* each having respective locating shoulders 86*a* and 86*b*. The moving coil form 87 is sealed for protection by a paper member 88. The cubic protuberance aids in properly orienting the tracking arm and pickup assembly with respect to the video disc record groove 24. Moreover, the use of the divergent support arms 84*a* and 84*b* reduces the moving mass of the system and extends the upper frequency range of the groove velocity error correction drive mechanism.

It will be noted that the tracking arm 52 is bent to have a first portion 53 substantially parallel to the bottom surface 15 of the conductive housing 14. This facilitates passage of the tracking stylus 30 and stylus support arm 40 through the opening 41 in the bottom portion of the conductive housing 14 with a minimum size opening. The sloped tracking arm minimizes the size of the opening which must be provided in the conductive housing 14 for free movement of the tracking arm 52 and stylus support arm 40 as the tracking sylus 30 follows the disc record groove 24. It is desirable to minimize the size of the opening 41 to reduce any possible radiation from the fixed frequency oscilllator which can escape from the conductive housing 14. The stylus support arm recessed surface 48 is sloped to compensate for the slope of the tracking arm 52. Specifically, the sloped recessed surface 48 compensates for the bend of the tracking arm 52 to insure that the longitudinal axis 31 of the tracking stylus 30 is substantially normal to the surface of the disc record 22. This reduces the effective total thickness of the conductive electrode 32 which is adjacent the geometrical variations in the bottom of the record groove. Where the stylus is improperly oriented, portions of the conductive electrode other than the edge can be in close proximity to the geometrical variations in the spiral groove 24. This may degrade the performance of the video playback system by reducing the upper frequency response of the system. The frequency response degradation is caused by the conductive electrode being affected by plural rather than individual geometrical variations in the bottom of the spiral groove 24.

Figure 5:
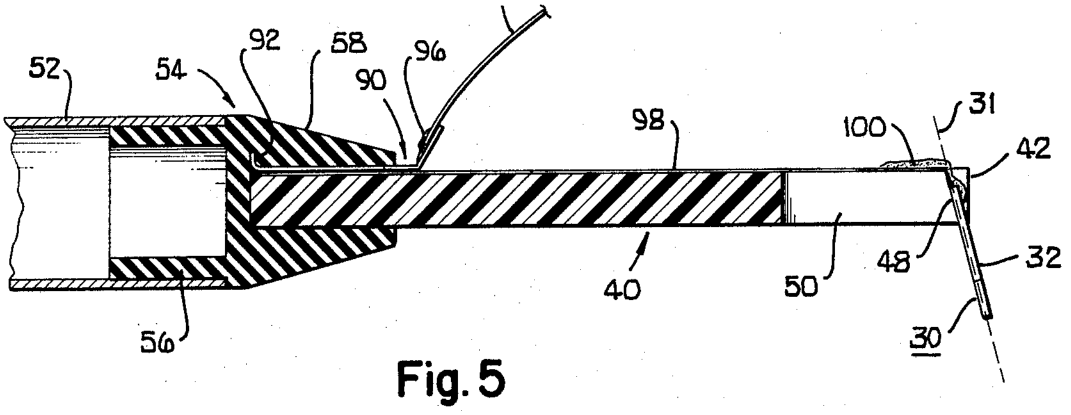
FIG. 5 is an enlarged partial longitudinal section view of a video playback system tracking arm and pickup assembly which includes a detachable connector and embodies a feature of the present invention.

Reference is now made to FIG. 5 which shows a video playback system tracking arm and pickup assembly including a detachable connector. A contact 90 is mounted within the conical portion 58 of the suspension member 54. The contact 90 includes a lip 92 which prevents movement of the contact within the suspension member 54. An electrical lead 94 is connected to the contact 90 by means of solder 96. The electrical lead 94 is connected to the video playback system tuned circuit housed within conductive compartment 36. The connection is a permanent connection and need not be disturbed when the stylus suspension arm is removed or replaced. Contact 90 engages a metallized surface 98 on the top of suspension arm 40. The metallized surface 98 is electrically connected to the stylus conductive electrode 32 by means of a silver paste 100. The detachable connector supports the tracking stylus in proper operating position when the stylus engages the disc record groove 24 and electrically connects the tracking stylus conductive electrode 32 to the video play back system tuned housing. Consequently, an inexperienced user can replace a worn stylus by merely removing the stylus suspension arm 40 supporting the worn stylus and replacing it with another stylus suspension arm supporting a new stylus.

What is claimed is:

1. In a video playback system for use with a video disc record having geometrical variations in a spiral groove on a major surface of said disc record, said video playback system employing signal processing circuitry subject to energizing oscillations, the combination comprising:

a tracking stylus for engaging said disc record spiral groove, said tracking stylus including an electrode for signal transfer as said disc record is rotated;

means for electrically connecting said stylus electrode to said signal processing circuitry;

means for shield said signal processing circuitry in order to limit radiation of said energizing oscillations, said shielding means comprising a conductive housing for said signal processing circuitry having a bottom surface subject to positioning adjacent said disc record during playback;

an elongated tracking arm yieldably supported at one end within said conductive housing and subject to rotational motion, as well as translatory motion in a direction substantially parallel to said housing bottom surface, during record playback; and support means for said tracking stylus at the end of said tracking arm remote from said one end for supporting said tracking stylus in signal transfer relation with said disc record when said tracking stylus engages said disc record;

wherein said housing has an opening in said bottom surface through which said remote end of said tracking arm protrudes during record playback, and through which radiation of said energizing oscillations may occur; said opening being dimensioned to accommodate said rotational and translatory motions of said tracking arm without engagement between said remote end and said housing;

and wherein said tracking arm includes a first straight portion, extending from said one end in substantially parallel relationship with said housing bottom surface during playback, and a further portion adjacent said first portion and curved toward said opening, whereby the opening area requirements requisite for said motion accommodation are reduced relative to the opening area requirements associated with such motion accomodation for a tracking arm of straight configuration between supported end and remote end.

2. In a video playback system including signal processing circuitry for transducing with a video disc record having geometrical variations in a spiral groove on a major surface of said disc record, the combination comprising:

a tracking stylus for engaging said disc record spiral groove, said tracking stylus including an electrode for signal transfer as said disc record is rotated;

means for electrically connecting said stylus electrode to said signal processing circuitry;

a conductive housing having an opening in the bottom surface thereof, said conductive housing mounted such that said opening is adjacent said disc record;

a first yieldable suspension means;

an elongated tracking arm supported within said conductive housing by said first yieldable suspension means and having a first portion substantially parallel to said conductive housing bottom surface and a second portion sloped toward said conductive housing opening; said first yieldable suspension means supporting said tracking arm at one end thereof in a manner enabling said tracking arm to follow vertical and lateral warpage of said video disc record groove; and support means for said tracking stylus mounted at the end of said tracking arm opposite to said one end and adjacent said conductive housing opening for supporting said tracking stylus in signal transfer relation with said disc record when said tracking stylus engages said disc record; said tracking stylus support means including a second yieldable suspension means for reducing the mass which must follow vertical and lateral warpage of said video disc record groove.

3. A video playback system as defined in claim 2 wherein said tracking stylus suspension means and said tracking arm suspension means are fabricated from a damped elastomer material.

4. In a video playback system including signal processing circuitry for transducing with a video disc record having geometrical variations in a spiral groove on a major surface of said disc record, the combination comprising:

a tracking stylus for engaging said disc record spiral groove, said tracking stylus including an electrode for signal transfer as said disc record is rotated;

a conductive housing having an opening in the bottom surface thereof, said conductive housing mounted such that said opening is adjacent said disc record;

an elongated tracking arm supported at one end within said conductive housing and having a first portion substantially parallel to said conductive housing bottom surface and a second portion sloped toward said conductive housing opening; and support means for said tracking stylus mounted at the end of said tracking arm remote from said one end and adjacent said conductive housing opening; said support means comprising demountable connector means for supporting said tracking stylus in proper operating position of said signal transfer when said tracking stylus engages said video disc record groove; said connector means also serving to effect electrical connection of said tracking stylus electrode to said signal processing circuitry;

wherein said demountable connector means includes a first member for supporting said tracking stylus and having a conductive element, and a second member mounted to said tracking arm and electrically connected to said signal processing circuitry, said first and second demountable connector means members adapted to cooperate such that said conductive element of said first member is electrically connected to said signal processing circuitry through said second member; and wherein said demountable connector first member includes a support element having a first end connected to said demountable connector second member, and a second end having first and second laterally spaced notched prongs, said notched prongs defining a recessed surface and said tracking stylus mounted in abutting relationship to said recessed surface.

5. A viedo playback system as defined in claim 4 wherein said detachable connector means second member includes a yieldable suspension means for reducing the mass which must follow vertical and lateral warpage of said video disc record groove.

6. A video playback system for use with a video disc record having information recorded thereon in the form of geometrical variations in a spiral groove on a major surface of said disc record, said record subject to having vertical and lateral warpage, said video playback system comprising:

a tracking stylus for engaging said disc record spiral groove, and adapted to cooperate with signal processing circuitry to detect and process said recorded information as said disc record is rotated;

a tracking arm for tracking said video disc record groove, said tracking arm having a first and a second end;

a first yieldable suspension means connected between said tracking stylus and said tracking arm first end for reducing the mass which must follow the vertical and lateral warpage of said disc record groove; and a support member;

a second yieldable suspension means connected between said tracking arm second end and said support member for pivotally supporting said tracking arm in a manner which enables said tracking arm to follow the vertical and lateral warpage of said video disc record;

wherein said support member is subject to translatory motion to effect correction of error in the relative velocity between said disc record groove and the engaging stylus, and wherein each of said first and second yieldable suspension means provides rigidity in the direction of said translatory motion to facilitate the transmission of said motion of said support member to said stylus.

7. The invention according to claim 6, including a conductive housing for substantially enclosing said tracking arm and including a given surface portion for disposition adjacent the major surface of said disc record, said tracking arm including a first portion and a further portion, said first portion extending between said second end and said further portion, with said first portion lying substantially parallel to said given surface, and said further portion angled toward said given surface, when said stylus engages said disc record groove.

8. A video playback system comprising;

a video disc record having information recorded thereon in the form of geometrical variations in a spiral groove on a major surface of said disc record, said record subject to having vertical and lateral warpage;

a tracking stylus engaging said disc record spiral groove, and adapted to cooperate with signal processing circuitry to detect and process said recorded information as said disc record is rotated;

a tracking arm for tracking said video disc record groove, said tracking arm having a first and a second end;

a first yieldable suspension means connected between said tracking stylus and said tracking arm first end for reducing the mass which must follow the vertical and lateral warpage of said disc record groove; and a second yieldable suspension means connected between said tracking arm second end and a support member for supporting said tracking arm in a manner which enables said tracking arm to follow the vertical and lateral warpage of said video disc record;

wherein said tracking arm support member is a groove velocity error correction drive mechanism and said second yieldable suspension member provides rigidity in a direction parallel to the direction of movement of said groove velocity error correction drive mechanism, and wherein said second yieldable suspension means includes a female receptacle adapted to cooperate with a male connector plug mounted to said groove velocity error correction drive mechanism.

9. A video playback system as defined in claim 8 wherein said groove velocity error correction drive mechanism includes a moving tubular coil form and said male connector plug is mounted to said one end of said tubular coil form by a support cone which seals said tubular coil from one end.

10. A video playback system as defined in claim 8 wherein said groove velocity error correction drive mechanism includes a moving tubular coil coil form and said plug is mounted to said tubular member by divergent support arms.

11. A video playback system as defined in claim 8 wherein said plug includes protuberances which cooperate with said second yieldable suspension means female receptacle to provide a detent.

12. A video playback system as defined in claim 11 wherein said plug protuberance cooperates with said female receptacle in a manner to provide a predetermined orientation for said tracking arm to insure a proper relationship between said tracking stylus and said disc record when said tracking stylus engages said disc record groove.

* * * * *